United States Patent
Joanny et al.

(10) Patent No.: US 10,298,474 B2
(45) Date of Patent: May 21, 2019

(54) AUTOMATIC BROADBAND INFORMATION CORRELATION AND RECORD GENERATION

(71) Applicants: ADAPTIVE SPECTRUM AND SIGNAL ALIGNMENT, INC., Redwood City, CA (US); Jerome M. Joanny, Sunnyvale, CA (US); Ardavan Maleki Tehrani, Menlo Park, CA (US)

(72) Inventors: Jerome M. Joanny, Sunnyvale, CA (US); Ardavan Maleki Tehrani, Menlo Park, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 113 days.

(21) Appl. No.: 15/028,932

(22) PCT Filed: Oct. 15, 2013

(86) PCT No.: PCT/US2013/064994
§ 371 (c)(1),
(2) Date: Apr. 12, 2016

(87) PCT Pub. No.: WO2015/057194
PCT Pub. Date: Apr. 23, 2015

(65) Prior Publication Data
US 2016/0254973 A1    Sep. 1, 2016

(51) Int. Cl.
*H04L 12/26* (2006.01)
*H04L 12/24* (2006.01)
*H04W 84/12* (2009.01)

(52) U.S. Cl.
CPC .......... *H04L 43/0817* (2013.01); *H04L 41/12* (2013.01); *H04L 43/08* (2013.01);
(Continued)

(58) Field of Classification Search
CPC . H04L 43/0817; H04L 43/08; H04L 43/0811; H04L 43/0823; H04L 43/087; H04L 43/0888; H04L 41/12
See application file for complete search history.

(56) References Cited

U.S. PATENT DOCUMENTS

| | | | |
|---|---|---|---|
| 2008/0052394 A1* | 2/2008 | Bugenhagen | H04L 12/14 709/224 |
| 2010/0091677 A1 | 4/2010 | Griff et al. | |

(Continued)

FOREIGN PATENT DOCUMENTS

WO    2009004661    1/2009

OTHER PUBLICATIONS

International Search Report and Written Opinion for International Application No. PCT/US13/64994 dated Jan. 20, 2014, 11 pages.

*Primary Examiner* — Ricky Q Ngo
*Assistant Examiner* — Stephen N Steiner
(74) *Attorney, Agent, or Firm* — North Weber and Baugh LLP (57) ABSTRACT

Embodiments include methods, systems, and apparatuses for automatic broadband information correlation and record generation. In one embodiment, a method includes receiving performance information related to a broadband connection of customer premises equipment (CPE), and receiving information related to a local network connected to the CPE. The method includes processing the local network information to generate location information associated with the CPE. The method further includes generating a record including the performance information and the location information associated with the CPE.

21 Claims, 7 Drawing Sheets

(52) U.S. Cl.
CPC ........ *H04L 43/087* (2013.01); *H04L 43/0811* (2013.01); *H04L 43/0823* (2013.01); *H04L 43/0888* (2013.01); *H04W 84/12* (2013.01)

(56) References Cited

U.S. PATENT DOCUMENTS

| | | | |
|---|---|---|---|
| 2010/0309790 A1* | 12/2010 | Polakos | H04L 12/66 370/241 |
| 2011/0275364 A1* | 11/2011 | Austin | H04L 41/12 455/423 |
| 2011/0286337 A1* | 11/2011 | Olsson | H04L 12/413 370/241.1 |
| 2011/0286437 A1* | 11/2011 | Austin | H04W 4/02 370/338 |
| 2012/0009890 A1 | 1/2012 | Curcio et al. | |
| 2012/0244885 A1* | 9/2012 | Hefetz | G06Q 20/32 455/456.2 |
| 2013/0339495 A1* | 12/2013 | Mower | H04L 41/0803 709/220 |

* cited by examiner

AUTOMATIC BROADBAND INFORMATION CORRELATION AND RECORD GENERATION

CLAIM OF PRIORITY

This application is a National Phase Application of, and claims priority to PCT Application No. PCT/US2013/064994, filed on 15 Oct. 2013, titled "AUTOMATIC BROADBAND INFORMATION CORRELATION & RECORD GENERATION," which is incorporated herein by reference in entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to broadband information correlation and record generation.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Many end-user consumers including residential consumers and business consumers connect to the Internet by way of broadband technologies. Broadband technologies can include, for example, Digital Subscriber Line (DSL), fiber, cable, WiFi, cellular, and microwave technologies. A given broadband technology can have widely varying performance due to a number of factors. The term "performance" herein refers generally to throughput, latency, jitter, connectivity, error rates, power consumption, transmit power, etc. Information about the performance of broadband technologies for end-consumers is typically collected privately by service providers and is not publicly available.

For example, with Digital Subscriber Line (DSL) technologies, a service provider provides its end-users with Internet bandwidth, at least a portion of which is carried over copper twisted pair telephone lines. The twisted wire pair infrastructure is known as the "loop plant." Information about the loop plant, such as the physical termination location of the loop and performance information for the loop, is traditionally property of the internet service provider (ISP) and associated local loop unbundling (LLU) providers. Thus, loop plant information is typically not publicly available. Additionally, the collection of loop plant information can be time consuming and costly due to the method of data collection. For example, service providers typically send technicians on site to make measurements. Furthermore, the value of the loop plant information maintained by service providers or others depends on the data collection and record keeping practices. Therefore, loop plant information may not be up-to-date or may be inaccurate in other ways. Information records for other broadband technologies have similar drawbacks.

The present state of the art may benefit from apparatuses, systems, and methods of automatically generating broadband information records without requiring service provider or user involvement that are described herein.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Described herein are systems, apparatuses, and methods for automatic broadband information correlation and record generation. Automatic broadband information correlation can include associating a physical location of a broadband connection with other information about a broadband connection, such as performance information, without involvement of a service provider or user. For example, in the case of a DSL loop, the method can involve associating a location at which the loop terminates with performance information about the DSL loop.

As will be described in greater detail below, in one embodiment, an agent residing in customer premises equipment (CPE) sends information to a broadband data manager, which can reside on a server (e.g., a cloud server). In one such embodiment, the information sent by the agent includes observed local network information (e.g., surrounding WiFi environment information) and performance information related to a broadband connection of the CPE. The broadband data manager can determine a physical location of the CPE through a number of means disclosed in the embodiments of the current invention, and therefore determine the approximate physical termination location of the broadband connection. The broadband data manager can then automatically correlate the broadband performance information with the determined location information and generate a record with the correlated information without involvement of the service provider or user.

In one embodiment, a method implemented by a broadband data manager includes receiving performance information related to a broadband connection of a CPE. The method further includes receiving performance information related to a local network connected to the CPE. The method further includes processing the local network information to generate location information associated with the CPE, and generating a record including the performance information and the location associated with the CPE.

Thus, the agent can enable automatic generation of a database which correlates broadband information with a location, eliminating reliance on inaccurate and privately-owned records. Such a database can be beneficial for parties desiring to determine performance of broadband connections within a vicinity. For example, providers of products or services for improving a broadband connection may wish to identify customers that can benefit most from their products or services. Users considering commencement of broadband services, or considering purchasing a product or service for improving an existing broadband connection can use such a database to obtain quantitative information to aid in their decisions. In one embodiment, as the agent becomes more widely available, the information contained within the system becomes richer and increases in value for external parties (e.g., CPE vendors, broadband modem providers, regulators, etc.) to mine.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within customer premises equipment to perform the methods and operations that are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

Figure 1:
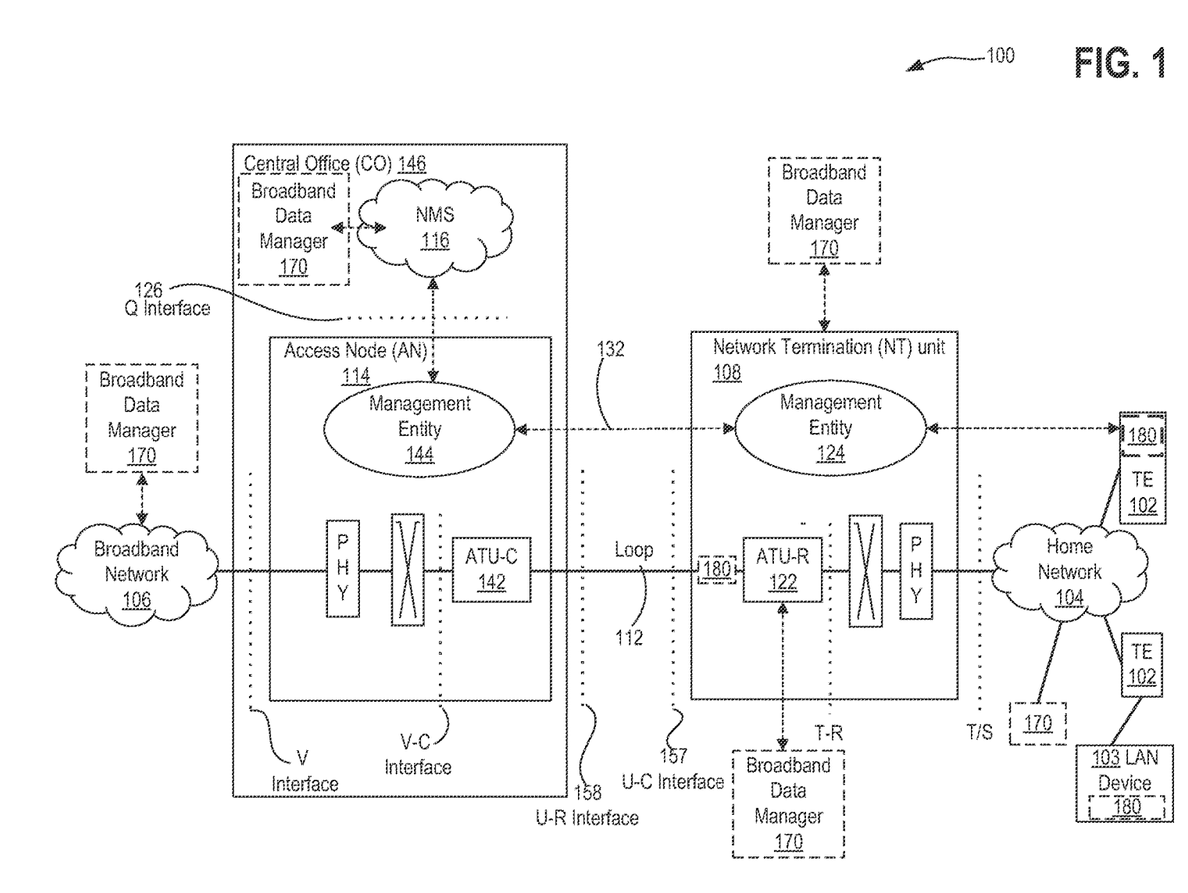
FIG. 1 illustrates an exemplary architecture in which embodiments may operate.

FIG. 1 illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data (which includes performance data) that is available at an Access Node (AN).

In FIG. 1, users terminal equipment (TE) 102 (e.g., a CPE device or a remote terminal device, network node, Local Area Network (LAN) device, etc.) is coupled to a home network 104, which in turn is coupled to a Network Termination (NT) Unit 108. The ADSL Transceiver Units (ATU) are further depicted (e.g., a device that provides ADSL modulation of a DSL loop or line). In one embodiment, NT unit 108 includes an ATU-R (ATU Remote) 122 (for example, a transceiver defined by one of the ADSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1being a long-established command language used to program responses and commands between telecommunication network elements. In one embodiment, Network Termination Unit 108 is communicably interfaced with a broadband data manager 170 as described herein. In another embodiment, ATU-R 122 is communicably interfaced with broadband data manager 170.

Each ATU-R 122 in a system may be coupled with an ATU-C(ATU Central) in a Central Office (CO) or other central location. ATU-C 142 is located at an Access Node (AN) 114 in Central Office 146. A Management Entity 144 likewise maintains an MIB of operational data pertaining to ATU-C 142. The Access Node 114 may be coupled to a broadband network 106 or other network, as will be appreciated by those skilled in the art. ATU-R 122 and ATU-C 142 are coupled together by a loop 112, which in the case of ADSL may be a twisted pair line, such as a telephone line, which may carry other communication services besides DSL-based communications. Management entity 124 or management entity 144 may implement and incorporate a broadband data manager 170 as described herein.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from ATU C 142, while far-end parameters from ATU R 122 may be derived by either of two interfaces over the UA interface. Indicator bits and EOC messages may be sent using embedded channel 132 and provided at the Physical Medium Dependent (PMD) layer, and may be used to generate the required ATU-R 122 parameters in ME 144. Alternately, the operations, Administration and Maintenance (OAM) channel and a suitable protocol may be used to retrieve the parameters from ATU R 122 when requested by Management Entity 144. Similarly, the far-end parameters from ATU C 142 may be derived by either of two interfaces over the U-interface. Indicator bits and EOC message provided at the PMD layer may be used to generate the required ATU-C 142 parameters in Management Entity 124 of NT unit 108. Alternately, the OAM channel and a suitable protocol can be used to retrieve the parameters from ATU C 142 when requested by Management Entity 124.

At the U interface (also referred to as loop 112), there are two management interfaces, one at ATU-C 142 (the U-C interface 157) and one at ATU-R 122 (the U-R interface 158). Interface 157 provides ATU-C near-end parameters for ATU-R 122 to retrieve over the U interface/loop 112. Similarly, U-R interface 158 provides ATU-R near-end parameters for ATU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, ATU-C and ATU-R pairs may use it for transporting physical layer OAM messages. Thus, the ATU transceivers 122 and 142 of such a system share various operational data maintained in their respective MIBs.

Depicted within FIG. 1 is broadband data manager 170 operating at various optional locations in accordance with several alternative embodiments. For example, broadband data manager 170 is located within home network 104, such as within a LAN. In an alternative embodiment, broadband data manager 170 is located at central office 146 and interfaced to home network 104 (e.g., a LAN) and broadband network 106 (e.g., a WAN) via NMS 116. In yet another embodiment, broadband data manager 170 operates on the broadband network 106 (e.g., on the WAN or Internet).

Also depicted within FIG. 1 is an agent 180 operating at various optional locations in accordance with several embodiments. For example, agent 180 may reside within TE 102, may reside within a LAN device 103 which is connected with TE 102, agent 180 may reside on the loop 112 at NT unit 108. These and other examples and their benefits and function will be described in further detail below.

As used herein, the terms "user," "end-user," "subscriber," "consumers," and/or "customer" refer to a person, business or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with, the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless communications operating company, an internet service provider, or any service that may independently or in conjunction with a broadband communications services provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), ADSL2, ADSL2plus, High-speed DSL (HDSL), HDSL2, Symmetric DSL (SDSL), SHDSL, Very high-speed/Very high-bit-rate DSL (VDSL), VDSL2, vectored VDSL2, and/or G.fast. Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communications service to a customer are made with respect to exemplary Digital Subscriber Line (DSL) equipment, DSL services, DSL systems and/or the use of ordinary twisted-pair copper telephone lines for distribution of DSL services. It should be understood that the methods and apparatus to characterize and/or test a transmission medium for communication systems disclosed herein may be applied to many other types and/or variety of communications equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with a linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2:
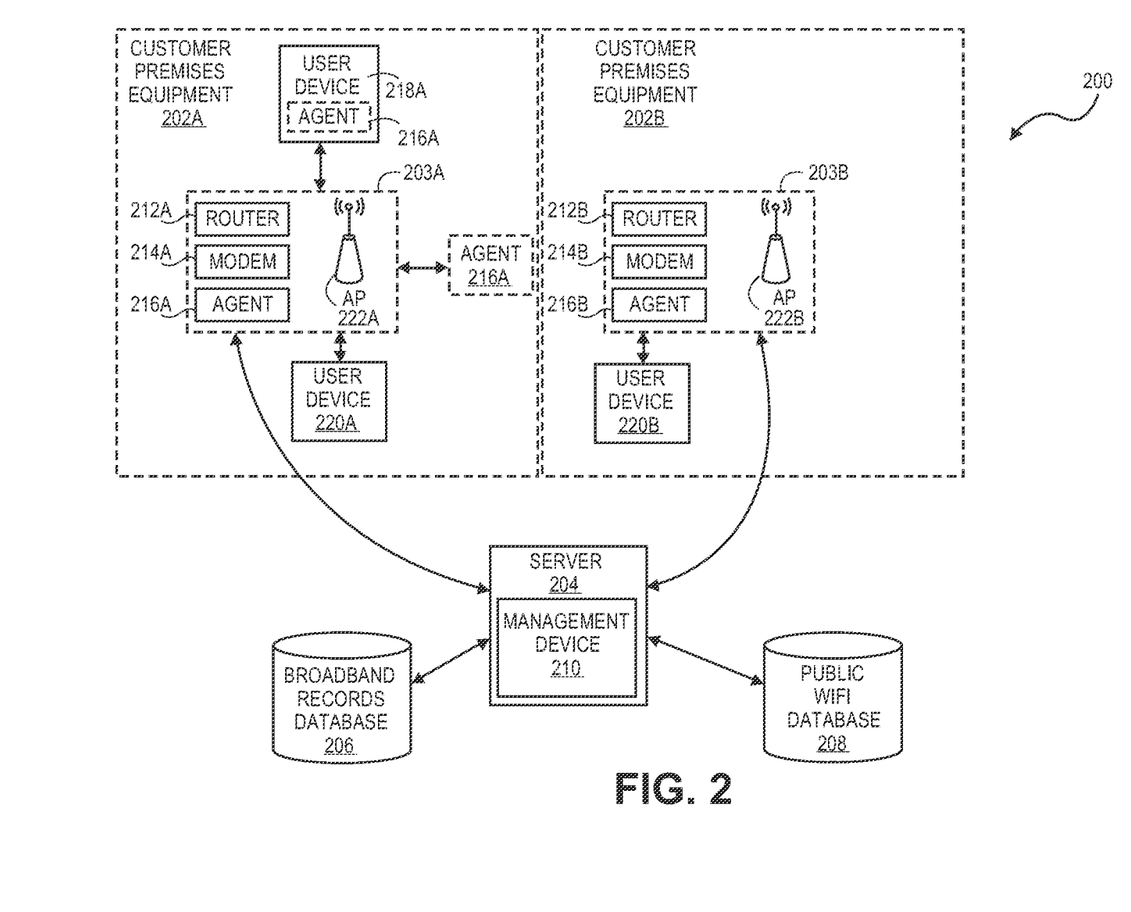
FIG. 2 illustrates an exemplary architecture in which embodiments may operate.

FIG. 2 illustrates an exemplary architecture 200 in which embodiments may operate. FIG. 2 depicts CPEs 202A and 202B. CPEs can include one or more of a router (e.g., an Ethernet connected router), an Ethernet connected wireless bridge, an Ethernet connected network bridge, and an Ethernet connected network switch, a modem (e.g., a DSL modem), a wireless access point (AP) (e.g., WiFi AP), an in-home power line device, a Home Phoneline Network Alliance (HPNA) based device, an in-home coax distribution device, a G.hn compatible device, a cellular telephony compatible device, a third generation (3G) compatible device, a fourth generation (4G) compatible device, a Long Term Evolution (LTE) compatible device, a WiFi device, an in-home appliance communicatively interfaced with the LAN, a computing device connected to the LAN, a HomePlug device, an IEEE P1901 standards compatible access Broadband over Power Line (BPL) device, an Ethernet connected computer peripheral device, or any other broadband compatible device. As illustrated in FIG. 2, CPEs 202A and 202B include combination devices 203A and 203B, which include routers 212A and 212B, modems 214A and 214B, agents 216A and 216B and wireless access points (APs) 222A and 222B.

Agents 216A and 216B are depicted as operating at various optional locations in accordance with several embodiments. For example, as illustrated in FIG. 2, combination devices 203A and 203B include the agents 216A and 216B. However, in other embodiments, devices including one or more of a modem, access point, and router, can include the agents 216A and 216B. In another embodiment, as depicted in CPE 202A, the agent 216A can reside in a user device 218A, or can exist as a separate device. In other embodiments, user devices do not include an agent, such as user devices 220A and 220B. Agents 216A and 216B can include software, firmware, hardware, or a combination thereof. In one embodiment, agents 216A and 216B include software embedded or installed on the corresponding CPE. As indicated above, FIG. 2 shows that the agents 216A and 216B are capable of operating in different locations. Although FIG. 2 illustrates the agents 216A and 216B as being capable of operating in various locations, a single agent as described herein is sufficient according to embodiments. Furthermore, although the description corresponding to FIG. 2 refers to two agents (an agent 216A in CPE 202A and an agent 216B in CPE 202B), embodiments of the invention may involve a single agent (e.g., CPE 202A may include the agent 216A, and CPE 202B may not include an agent, or vice versa, according to an embodiment).

Agents 216A and 216B are communicatively coupled with a server 204, which includes a broadband data manager 210. The server can include any suitable computing device with a broadband data manager as described herein, for example, the systems illustrated in FIGS. 7 and 8. In one embodiment, server 204 is a cloud server.

According to one embodiment, the broadband data manager 210 receives performance information related to a broadband connection of the CPE from an agent on the CPE. For example, agent 216A sends performance information related to a broadband connection of CPE 202A to the broadband data manager 210. The transmitted performance information can relate to one or more broadband connections, for example, DSL, fiber, cable, WiFi, cellular, and microwave connections. The performance information can include one or more of throughput, data rate, error statistics, signal strength/power, latency, jitter, connectivity, power consumption, or any other information related to performance of a broadband connection. According to one embodiment, the broadband data manager 210 receives other information related to a broadband connection, for example, attributes such as loop length of a DSL loop.

In one embodiment, the agents 216A and 216B can communicate with other software, firmware, or hardware on the CPE to extract such performance data. For example, the agent 216A and 216B can extract the performance information from a chipset of the CPE. Other embodiments can include observation and/or collection of data not typically stored by the CPE, and/or performing calculations on the data. For example, in one embodiment in which the CPE includes a DSL modem coupled with a central office by a loop, the agent can determine the approximate loop length by looking at attenuation of data received over the DSL line. In one embodiment, the agent can receive the information from a line enhancement device, co-located with the CPE. A line enhancement device can include devices such as, for example, a noise canceller that reduces interference noise on a line (e.g., a DSL line), or any device which improves the quality of the broadband connection.

In one embodiment, the broadband data manager 210 also receives information related to a local network connected to the CPE. The local network information can include information related to one or more of WiFi, Multimedia over Coax Alliance (MoCA), Power Line Communication (PLC), HomePlug, Ethernet, Femtocell, or any other local network. Such network information can include one or more of a WiFi network identifier of the CPE, one or more WiFi network identifiers of neighboring LANs, a Global Positioning System (GPS) location, an Internet Protocol (IP) address of the CPE, an IP address of another LAN device, a MAC address of the CPE, a MAC address of another LAN device, or any other identifying local network information. Thus, according to different embodiments, agents 216A and 216B can send local network information associated with a CPE on which the agent is located, local network information associated with other neighboring CPEs, or a combination of both. For example, agent 216A can send a WiFi network identifier associated with AP 222A, and/or a WiFi network identifier associated with the neighboring AP 222B. Similarly, the agent 216A can send an IP address of the CPE 202A, and/or an IP address of the CPE 202B. Although only two CPEs are illustrated, the described embodiments can operate with any number of CPEs. For example, if N WiFi APs are visible to the agent 216A, the agent 216A can send WiFi network identifiers for some or all of the N visible APs to the broadband data manager 210.

According to one embodiment, the transmission of performance and local network information by the agents 216A and 216B is automatic. For example, in one embodiment, the agents 216A and 216B of CPEs 202A and 202B can send the performance and local network information upon power-up. Sending the information upon power-up can include sending the information the first time the CPE with the agent is powered on, and/or can include sending such information every time the CPE is powered on or restarted. In one embodiment, in addition to, or instead of, automatically sending such information upon power-up, the agents 216A and 216B can send updated information at one or more additional times and/or according to a predetermined periodic schedule. For example, in one embodiment, the agents 216A and 216B can automatically send updated information to the broadband data manager 210 on an hourly basis.

According to one embodiment, the broadband data manager 210 processes the local network information to generate location information associated with the CPE. In one such embodiment, the broadband data manager 210 queries a public database (e.g., public WiFi database 208) with the received local network information to obtain location information associated with that local network, and therefore associated with the CPE. According to one such embodiment, public WiFi database 208 includes a table of SSIDs and locations mapped to those SSIDs. When querying the public WiFi database 208, the broadband data manager 210 can use an SSID of the LAN to which a CPE is connected, SSIDs of neighboring LANs, or a combination thereof. Querying the public WiFi database 208 with SSIDs of neighboring LANs (in addition to, or instead of the SSID of a LAN to which a particular CPE is connected) can increase the likelihood of precisely identifying a location associated with the particular CPE. Furthermore, by using SSIDs of neighboring LANs, the broadband data manager 210 may in some circumstances accurately determine location information for a CPE, even if an SSID for a LAN connected to the CPE is not in the public WiFi database 208.

The broadband data manager 210 can then automatically create a record associating the generated location information with the received performance information. An example of such a record is further described below with reference to FIG. 4. According to one embodiment, the automatically created records can form broadband record database 206 without user or service provider involvement.

Although FIG. 2 and the associated description describe embodiments in which the broadband data manager 210 is the entity which queries the public WiFi database 208 and generates records in the broadband records database 206, in some embodiments, the agents 216A and 216B can directly query the public WiFi database 208 and/or generate records in the broadband records database 206. For example, in one embodiment, an agent can query the public WiFi database 208 and determine location information associated with the CPE. The agent can then send the location information and associated performance information to the broadband data manager 210 to create a record in the broadband records database 206. In another such embodiment, an agent can directly create a record in the broadband records database 206.

Figure 3:
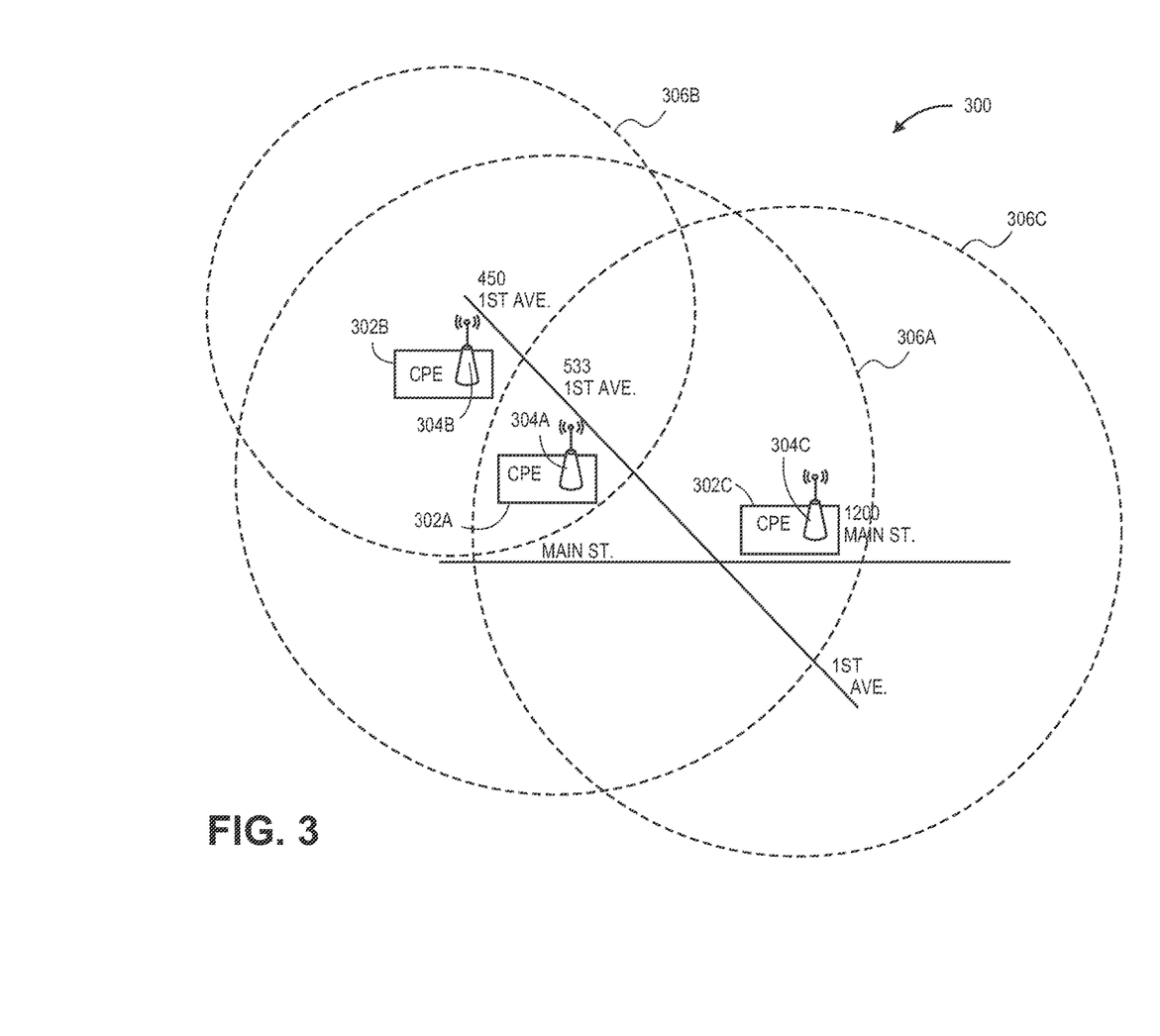
FIG. 3 illustrates an environment in which embodiments may operate.

FIG. 3 illustrates an exemplary environment 300 in which embodiments may operate. The environment 300 depicts two streets, $1^{st}$ Ave. and Main St., on which CPEs 302A-302C are located. In this illustrated example, each CPE is associated with a street address. For example, CPE 302A is associated with street address 533 $1^{st}$ Ave., CPE 302B is associated with street address 450 $1^{st}$ Ave., and CPE 302C is associated with street address 1200 Main St. In one embodiment, a CPE can be associated with a street intersection. For example, CPEs 302A-302C can be associated with the intersection of $1^{st}$ Ave and Main St. In other embodiments, CPEs 302A-302C may be associated with other location information in addition to or instead of street addresses or intersections. For example, a CPE can be associated with GPS coordinates. In one embodiment, a CPE is associated with a city name, county name, a landmark, a business name, and/or any other identifier capable of identifying a geographic location. Location information associated with CPE can include a single type of information (e.g., a street address), or multiple types of identifying information (e.g., a city name and a business name).

As illustrated in FIG. 3, the CPEs 302A-302C include wireless access points 304A-304C. Each of the wireless access points 304A-304C can communicate with devices in a particular radius. For example, devices within the area defined by the circle 306A can detect a network identifier (e.g., SSID) for the wireless AP 304A. Similarly, devices within the area defined by the circles 306B or 306C can detect network identifiers for the corresponding wireless AP 304B or 304C.

In one embodiment, the CPEs 302A-302C each include an agent as described herein. For example, the CPEs 302A-302C can include agents as described with reference to agents 216A and 216B of FIG. 2. As mentioned above with reference to FIG. 2, a broadband data manager is more likely to determine accurate location information for a CPE if neighboring network identifiers are used, according to some embodiments. For example, in FIG. 3, an agent in CPE 302B can send an SSID for wireless AP 304B to a broadband data manager. In one such example where the transmitted SSID is unique and in a public WiFi database, the broadband data manager can determine the location information for that SSID, and therefore associated with the CPE. In one such example where the SSID is not unique and/or not present in a public WiFi database, the broadband data manager may rely on SSIDs of neighboring wireless APs, according to one embodiment. For example, CPE 302B is in range of wireless APs 304A-304C, and therefore SSIDs for wireless APs 304A-304C are visible to CPE 302B, according to one embodiment. In one such embodiment, an agent in CPE 302B sends the SSIDs for multiple nearby wireless APs 304A-304C to the broadband data manager. Similarly, agents in CPE 302A and 302C can send visible network identifiers to the broadband data manager, which can determine location information by processing the network identifiers.

According to one embodiment, the broadband data manager can determine expected performance for a CPE using performance information for nearby CPEs. Expected performance may be determined for CPEs with or without an agent. One example of determining expected performance may involve receiving location information for the target CPE (e.g., an address or GPS coordinates) from a user. The broadband manager can then use the location information provided by the user to run a query in a broadband records database for nearby locations. Locations of other CPEs can be considered "nearby" the target CPE according to predetermined criteria, for example, a distance from the target CPE. Performance information for nearby CPEs is then obtained and used to determine the expected performance of the target CPE.

For example, in one embodiment, determining expected performance for the target CPE may involve performing averaging or other calculations using the performance information for nearby CPEs. Averaging or other calculations may be useful for circumstances where the broadband data manager identifies multiple records for nearby CPEs. Other embodiments may not require averaging or other calculations, but instead may involve directly equating the expected performance for the target CPE to a value determined for a nearby CPE. Such an approach may be used, for example, where the broadband data manager identifies a single relevant record for a nearby CPE.

In one embodiment, a congestion map of the WiFi access point in the neighborhood area of the broadband connection is generated. The congestion map represents the locations of the WiFi access points with respect to each other. Such map assists the broadband service providers, as well as the broadband users to understand the topology of the wireless network in the area surrounding or in the vicinity or neighborhood of a broadband connection, WiFi access point or CPE.

The congestion map could include information such as setup, configuration and/or performance information with respect to each WiFi access point mapped. The setup information comprises at least one of: frequency band of operation, channel info, transmit power of the corresponding access points. The performance information comprises at least one of: throughput, data rate, error statistics, signal strength, latency, jitter, connectivity, and power consumption.

Analysis of the setup and performance information associated with the mapped access point, assists in understanding any bottlenecks in frequency allocation, or channel congestion, or interference issues between the access points. An operator, a broadband service provider, a third party WiFi management service, or the end users can use the information to change, modify or optimize the performance and setup of their corresponding access points accordingly. For example, if the information shows that more than one or more access points are too close, then an exemplary remedy to improve performance or reduce interference is to relocate the access points. An operator or a third party could initiate an advisory action or a notice to the end user to relocate their access points to a new location with a safer distance. In another example, if too many access point are using the same channel, creating a channel congestion, an advisory action could be generated, or the broadband management server to issue instructions to the desired access point to change its WiFi channel to a band not heavily used or congested.

Figure 4:
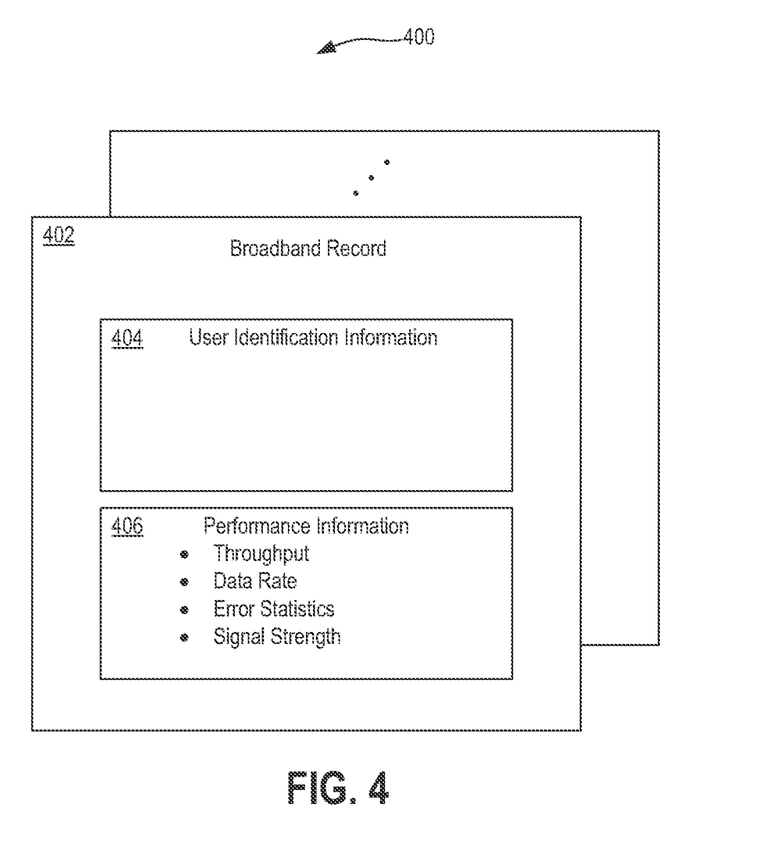
FIG. 4 illustrates a diagrammatic representation of a broadband record, according to embodiments.

FIG. 4 illustrates a diagrammatic representation of broadband records 400, according to embodiments. Broadband record 402 is one of many records in a database, and includes information for one or more broadband connections to a CPE. As illustrated in FIG. 4, in one embodiment, broadband record 402 includes user identification information 404. In the illustrated embodiment, broadband record 402 also includes performance information 406 for a broadband connection, such as throughput, data rate, error statistics, and signal strength. In one embodiment, performance information 406 is related to at least one or more of DSL, fiber, cable, WiFi, cellular, and microwave. In other embodiments, a broadband record can include additional information not depicted in broadband record 402, and/or can omit some of the information depicted in broadband record 402.

Figure 5:
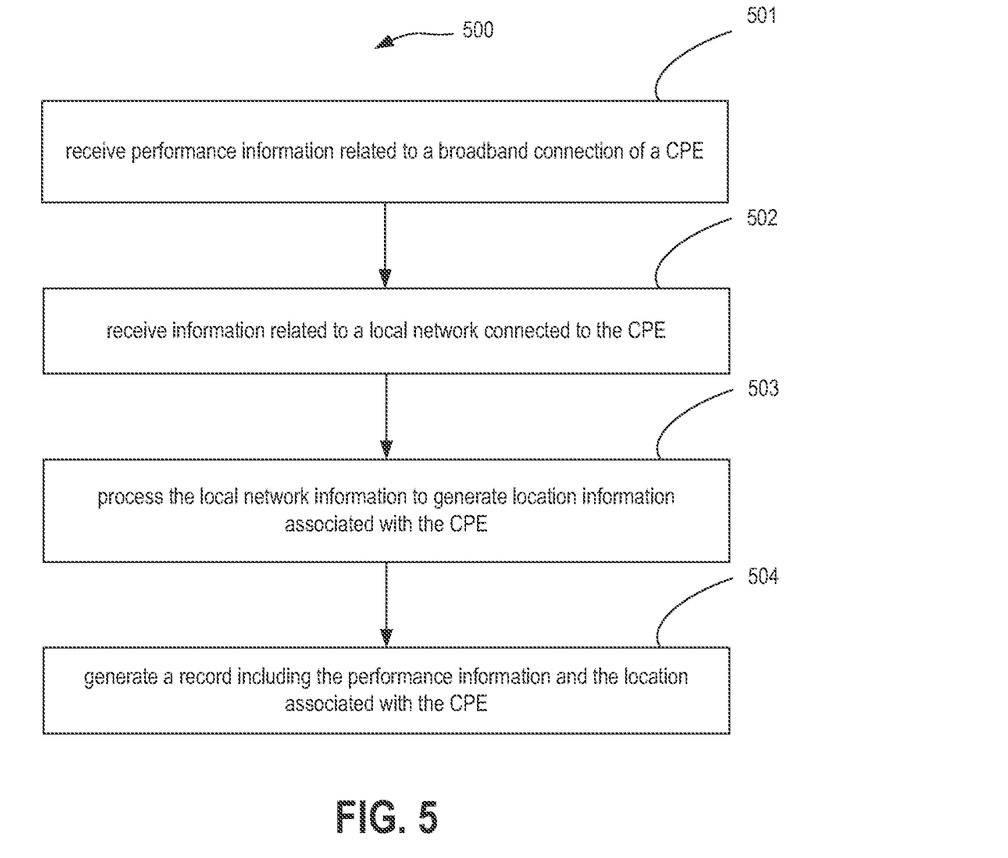
FIG. 5 illustrates a flow diagram illustrating a method in accordance with described embodiments.

FIG. 5 illustrates a flow diagram illustrating a method in accordance with described embodiments.

The method 500 begins at block 501 with the broadband data manager (e.g., broadband data manager 210 of FIG. 2) receiving performance information related to a broadband connection of a CPE (e.g., CPE 202A and 202B of FIG. 2). At block 502, the broadband data manager receives information related to a local network connected to the CPE.

At block 503, the broadband data manager processes the local network information to generate location information associated with the CPE. According to one embodiment, processing the local network information includes querying a public database with the one or more WiFi network identifiers of neighboring LANs to obtain location information for the WiFi network identifier of the CPE. In another embodiment, processing the local network information includes querying a public database with the IP address of the CPE or the IP address of the other LAN device to obtain the location information of the CPE. According to one embodiment, the method further includes obtaining the GPS location of the CPE from LAN devices connected to the same LAN as the CPE in order to obtain the location information.

The method ends at block 504 with the broadband data manager generating a record (e.g., record 402 of FIG. 4) including the performance information and the location associated with the CPE.

Figure 6:
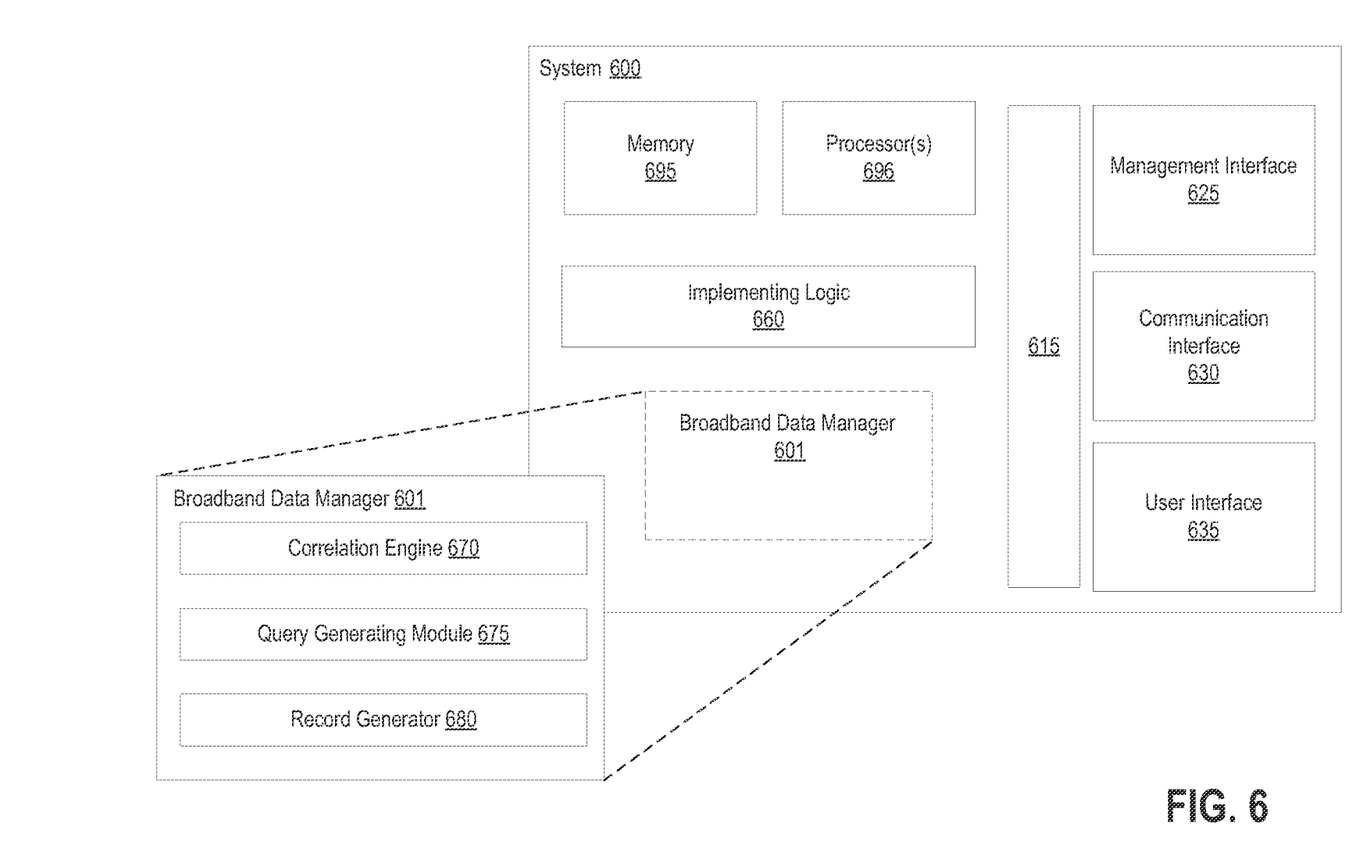
FIG. 6 shows a diagrammatic representation of a system in which embodiments may operate, be installed, integrated, or configured.

FIG. 6 shows a diagrammatic representation of a system 600 in accordance with which embodiments may operate, be installed, integrated, or configured.

In one embodiment, system 600 includes a memory 695 and a processor or processors 696. For example, memory 695 may store instructions to be executed and processor(s) 696 may execute such instructions. Processor(s) 696 may also implement or execute implementing logic 660 having logic to implement the methodologies discussed herein. System 600 includes communication bus(es) 615 to transfer transactions, instructions, requests, and data within system 600 among a plurality of peripheral devices communicably interfaced with one or more communication buses 615. In one embodiment, system 600 includes a communication bus 615 to interface, transfer, transact, relay, and and/or communicate information, transactions, instructions, requests, and data within system 600, and among plurality of peripheral devices.

System 600 further includes management interface 625, for example, to receive requests, return responses, and otherwise interface with network elements located separately from system 600. System 600 further includes communications interface 630 which provides connectivity between system 600 and the various network elements. Communications interface 630 can include a LAN interface, a WAN interface, or any other interface for communication with other communicatively coupled entities. System 600 further includes a user interface 635, via which users may submit requests to the broadband data manager 601.

Distinct within system 600 is broadband data manager 601 which includes correlation engine 670, query generating module 675, and record generator 680. According to one embodiment, query generating module 675 uses received information from an agent on a CPE to generate queries for a public WiFi database. Correlation engine 670 uses the information returned from the queries to the public WiFi database to associate a location of the CPE with other broadband performance information associated with a broadband connection to the CPE. Record generator 680 creates a record with the associated location and performance information. Broadband data manager 601 may be installed and configured in a compatible system 600 as is depicted by FIG. 6, or provided separately so as to operate in conjunction with appropriate implementing logic 660 or other software.

Figure 7:
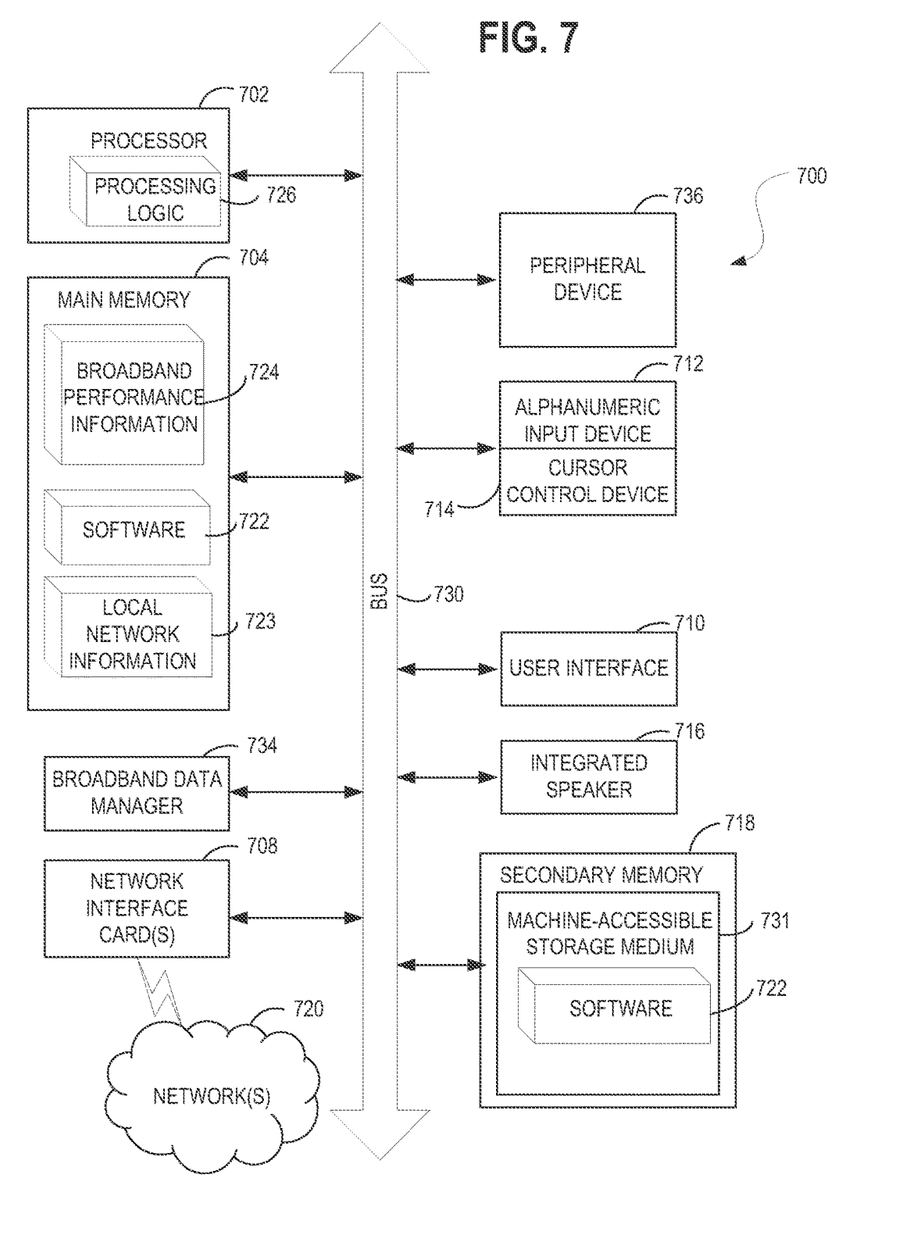
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected (e.g., networked) to other machines in LAN, a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server (e.g., a cloud server), a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent data base implementations), which communicate with each other via a bus 730. Main memory 704 includes information and instructions and software program components necessary for performing and executing the functions with respect to the various embodiments of the broadband data manager as described herein. Main memory 704 stores broadband performance information and local network information received for use by the broadband data manager 734. The broadband data manager 734 processes the local network information 723 to determine location information associated with a CPE, which can also be stored in main memory 704. The broadband data manager 734 then generates a record associating the determined location information and the broadband performance information 724. Main memory 704 and its sub-elements (e.g. 723 and 724) are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include one or more network interface cards 708 to communicatively interface the computer system 700 with one or more networks 720 from which information may be collected for analysis. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of a Broadband data manager 734 capable interfacing networks, monitoring, collecting, analyzing, and reporting information, and initiating, triggering, and executing various management events including the execution of commands and instructions to automatically generate broadband records, as well as the various other functions and operations described herein.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

We claim:

1. A method for increasing the quality of a broadband connection, the method comprising:
    receiving, at a network termination unit, performance information that is related to a broadband connection of customer premises equipment (CPE) and that comprises a loop length received from an agent, the agent being communicatively coupled to the CPE to determine the loop length from attenuation data obtained from a line enhancement device coupled to the CPE;
    receiving information related to a local network connected to the CPE;
    processing the local network information to generate location information that comprises at least one physical termination location of a DSL loop and is associated with the CPE, wherein processing the local network information comprises querying at least a public database with one or more WiFi network identifiers of neighboring LANs to obtain location information for a WiFi network identifier of the CPE;
    generating a record comprising the performance information and the location information associated with the CPE; and
    using performance information associated with CPEs geographically near to a target CPE to determine an expected performance of the target CPE.

2. The method of claim 1, wherein the performance information is related to at least one or more of:
    Digital Subscriber Line (DSL),
    fiber,
    cable,
    WiFi,
    cellular, or
    microwave.

3. The method of claim 1, wherein the local network comprises at least one of:
WiFi,
Multimedia over Coax Alliance (MoCA),
Power Line Communication (PLC),
HomePlug,
Ethernet, or
Femtocell.

4. The method of claim 1, wherein the performance information comprises at least one of:
throughput,
data rate,
error statistics,
signal strength,
latency,
jitter,
connectivity, or
power consumption.

5. The method of claim 1, wherein the network information comprises at least one of:
a WiFi network identifier of the CPE,
one or more WiFi network identifiers of neighboring local area networks (LANs),
Global Positioning System (GPS) location,
an IP address of the CPE, or
an IP address of another LAN device.

6. The method of claim 5, wherein processing the local network information comprises:
querying a public database with the IP address of the CPE or the IP address of the other LAN device to obtain the location information of the CPE.

7. The method of claim 5, further comprising:
obtaining the GPS location of the CPE from LAN devices in order to obtain the location information of the CPE.

8. The method of claim 1, wherein the WiFi network identifiers of the network identifiers of neighboring LANs are service set identifications (SSIDs).

9. The method of claim 1, wherein the CPE comprises one or more of:
a Digital Subscriber Line (DSL) modem,
a WiFi router,
an Ethernet connected wireless bridge,
an Ethernet connected network bridge,
an Ethernet connected network switch,
a wireless access point,
an in-home power line device,
a Home Phoneline Network Alliance (HPNA) based device,
an in-home coax distribution device,
a G.hn compatible device,
a cellular telephony compatible device,
a third generation (3G) compatible device,
a fourth generation (4G) compatible device,
a Long Term Evolution (LTE) compatible device,
a WiFi device,
an in-home appliance communicatively interfaced with a LAN,
a computing device connected to the LAN,
a HomePlug device,
an IEEE P1901 standards compatible access Broadband over Power Line (BPL) device, or
an Ethernet connected computer peripheral device.

10. The method of claim 1, wherein the location information of the CPE comprises one or more of a geographic coordinate, a street address, a street intersection, or a city name associated with the local network information.

11. A non-transitory computer readable storage medium having instructions stored thereon that, when executed by a processor, cause the processor to perform operations comprising:
receiving, at a network termination unit, performance information that is related to a broadband connection of customer premises equipment (CPE) and that comprises a loop length received from an agent, the agent being communicatively coupled to the CPE to determine the loop length from attenuation data obtained from a line enhancement device coupled to the CPE;
receiving information related to a local network connected to the CPE;
processing the local network information to generate location information that comprises at least one physical termination location of a DSL loop and is associated with the CPE, wherein processing the local network information comprises querying at least a public database with one or more WiFi network identifiers of neighboring LANs to obtain location information for a WiFi network identifier of the CPE;
generating a record comprising the performance information and the location information associated with the CPE; and
using performance information associated with CPEs geographically near to a target CPE to determine an expected performance of the target CPE.

12. The non-transitory machine-readable storage medium of claim 11, wherein the performance information is related to at least one of:
Digital Subscriber Line (DSL),
fiber,
cable,
WiFi,
cellular, or
microwave.

13. The non-transitory machine-readable storage medium of claim 11, wherein the local network comprises at least one of:
WiFi,
Multimedia over Coax Alliance (MoCA),
Power Line Communication (PLC),
HomePlug,
Ethernet, or
Femtocell.

14. The non-transitory machine-readable storage medium of claim 11, wherein the performance information is at least one-of:
throughput,
data rate,
error statistics,
signal strength,
latency,
jitter,
connectivity, or
power consumption.

15. The non-transitory machine-readable storage medium of claim 11, wherein the network information comprises one of:
a WiFi network identifier of the CPE,
one or more WiFi network identifiers of neighboring local area networks (LANs),
Global Positioning System (GPS) location,
an IP address of the CPE, or
an IP address of another LAN device.

16. A system for increasing the quality of a broadband connection, the system comprising:
- a communication interface to receive performance information related to a broadband connection of customer premises equipment (CPE) and information related to a local network connected to the CPE, the performance information comprising a loop length;
- a line enhancement device coupled to the CPE;
- an agent communicatively coupled to both the CPE and the line enhancement device, the agent obtains from the line enhancement device attenuation data and determines the loop length therefrom;
- a broadband data manager to process the local network information to generate location information that comprises at least one physical termination location of a DSL loop and is associated with the CPE, wherein processing the local network information comprises querying at least a public database with one or more WiFi network identifiers of neighboring LANs to obtain location information for a WiFi network identifier of the CPE, and wherein the broadband data manager is to create a record comprising the performance information and the location information associated with the CPE and use at least some of the performance information associated with CPEs geographically near to a target CPE to determine an expected performance of the target CPE.

17. The system of claim 16, wherein the performance information is related to at least one of:
Digital Subscriber Line (DSL),
fiber,
cable,
WiFi,
cellular, or
microwave.

18. The method of claim 1, further comprising:
creating a congestion map of WiFi access points in a neighborhood area of the broadband connection,
wherein the congestion map comprises locations of the WiFi access points with respect to each other.

19. The method of claim 18, wherein the congestion map further comprises:
setup and WiFi performance information with respect to each of the WiFi access points mapped.

20. The method of claim 19, wherein the setup information comprises at least one of: frequency band of operation, channel info, or transmit power.

21. The method of claim 19, wherein the WiFi performance information comprises at least one of:
throughput,
data rate,
error statistics,
signal strength,
latency,
jitter,
connectivity, or
power consumption.

* * * * *